3,524,877
METHOD OF PRODUCING KETO ACIDS
Klaus Haage, Berlin-Pankow, and Heinz Reinheckel, Berlin, Germany, assignors to Deutsche Akademie der Wissenchaften Zu Berlin, Berlin-Adlershof, Germany
No Drawing. Filed June 17, 1966, Ser. No. 558,227
Int. Cl. C07c 63/00, 53/00, 57/00
U.S. Cl. 260—515                     12 Claims

ABSTRACT OF THE DISCLOSURE

Saturated and unsaturated γ- and δ-keto acids are produced by reacting saturated or unsaturated dicarboxylic acid anhydrides with alkyl aluminum compounds followed by hydrolysis.

---

The present invention relates to a method of producing keto acids, and particularly keto acids with γ- and δ-position keto groups, as well as the production of saturated and unsaturated lactones thereof, using aluminum alkyl compounds for the production.

Keto acids are surface active substances. They serve as starting materials in the plastics industry, as wetting agents and washing agents. The saturated reduction products of γ-keto acids, the γ-hydroxy fatty acid lactones, are used in the fat industry as flavoring substances, while the corresponding lactones of unsaturated keto acids or hydroxy acids in recent times have been used in connection with their growth inhibiting action in the treatment of tumors.

It is known that γ-keto acids can be produced from acetyl succinic acid diester, maleic acid diester or ethyl acetoacetate by condensation reactions and subsequent hydrolytic decomposition of the condensation product. This method requires several reaction stages and in most cases gives only low yields.

γ- and δ-keto acids are obtained together upon the oxidation of the ammonium salts of fatty acids with hydrogen peroxide. Besides a relatively low yield, this method suffers from the disadvantage of requiring a separation operation to separate the isomers from each other.

δ-keto acids can be obtained by alkylation of cyclohexanedione-(1,3) with alkyl-halogen compounds and subsequent hydrolysis. The method provides good yields but is not suitable for all δ-keto acids to the same extent, and in addition requires several reaction stages.

Several methods are known for the production of keto acids by the use of metal alkyl compounds. Thus, for example, N-methylsuccinimide can be converted with Grignard compounds into the pre-product of γ-keto acids [1-methyl-2-alkyl-pyrrolone-(5)].

While Grignard compounds, because of their reactability with respect to the CO-groups in general, can provide for the production with dicarboxylic acid dihalides, dicarboxylic acid semi-ester halides or dicarboxylic acid anhydrides, with the exception of several aromatic compounds, either none at all or only small amounts of keto acids, it is known that cadmium alkyls and zinc alkyls can form the corresponding keto acids or keto acid esters with these dicarboxylic acid derivatives. Particularly in the case of aliphatic γ- and δ-keto acids, however, the yield is quite low (30% and less) while in the case of aromatic keto acids yields of about 60% are obtained. All of these methods moreover suffer from the generally important disadvantage that they cannot be carried out under technical conditions for production in large quantity. The magnesium alkyls, cadmium alkyls and zinc alkyls are unstable and decompose even at normal temperatures. They can only be stored in several specific solvents and used therein, and their production is expensive.

A method has been described for the reaction of aluminum alkyl compounds with dicarboxylic acid semi-ester chlorides to produce keto acid esters. The yields amount in the case of γ-keto acid esters and the δ-keto acid esters to at most 75%, while for keto acid esters with a keto group further removed than the δ-position yields of 90–95% can be obtained.

A proposal has already been made to produce free γ-keto acids by the reaction of 1,2-dicarboxylic acid dihalides with aluminum alkyl compounds. The yields of this process lie between about 60 and 90%. However the process is strictly limited to the production of γ-keto acids. Moreover, the dicarboxylic acid dihalides are difficult to obtain, which is a very important disadvantage which applies also for the dicarboxylic acid semi-ester chlorides.

Aluminum alkyl compounds can be produced in large amounts and stored also in large amounts and diluted as desired. Consequently, these compounds provide important advantages as compared to the use of magnesium alkyl, cadmium alkyl and zinc alkyl compounds.

It is accordingly a primary object of the present invention to provide a simple method for the production of keto acids, particularly keto acids with γ-position and δ-position keto groups, as well as to provide for the production of their corresponding saturated and unsaturated lactones, starting from easily obtainable and producible starting products.

It is another object of the present invention to provide a simple and economical method of producing keto acids with γ-position and δ-position keto groups, which method is generally applicable to the broad class of such compounds, and which method can be used for technical large scale production.

It is still a further object of the present invention to provide for the production of γ-position and δ-position keto acids using aluminum alkyls as the starting compounds.

Other objects and advantages of the present invention will be apparent from a further reading of the specification and of the appended claims.

With the above and other objects in view, the present invention mainly comprises the reaction of an acid anhydride of a saturated or unsaturated, substituted or unsubstituted, aliphatic or aromatic dicarboxylic acid with an aluminum compound of the formula:

$$R_nAlX_{3-n}$$

wherein R is selected from the group consisting of aliphatic, arylaliphatic, cycloaliphatic and aromatic radicals, wherein X is halogen and wherein n is between 1 and 3, thereby forming the corresponding keto acid thereof. When R is aliphatic it is an alkyl having 2 to 8 carbon atoms.

Among the suitable acid anhydrides of dicarboxylic acids usable for the method of the present invention may be mentioned succinic acid anhydride, maleic acid anhydride, phthalic acid anhydride and glutaric acid anhydride, which may be used with or without solvents therefor.

The reaction can preferably be carried out at low temperatures in a solvent under stirring by the addition of the aluminum alkyl compound to the dicarboxylic acid anhydride solution, or, in the case of slight solubility of the acid anhydride, to a suspension thereof. If the reaction is to proceed without a solvent, then the acid anhydride in finely divided form is slowly and under vigorous stirring added to the liquid aluminum alkyl compound.

Among the suitable solvents are the partially halogenated hydrocarbons, particularly methylene chloride. The reaction temperature can be between −30° C. and +100° C. It is particularly desirable in the case of the production of α,β-unsaturated γ-keto acids of the general formula:

R—CO—CH=CH—COOH to operate at the lowest possible temperature, that is at a temperature below −10° C.

The mol ratio of the aluminum alkyl compound to the dicarboxylic acid anhydride should be greater than 1, and is preferably between about 1.5 and 2.0. That portion of the mol ratio of the aluminum alkyl compound which exceeds 1.0 can, in accordance with a preferred embodiment of the present invention, be substituted by a water-free aluminum trihalide, particularly aluminum trichloride.

In this case, the aluminum alkyl compound is added to a solution of a mixture of the acid anhydride and the aluminum trihalide. This possibility is of value since in the case of the subsequent hydrolytic working up of the reaction material all excess alkyl groups of the aluminum compound are lost in the form of hydrocarbons.

The hydrolysis for the purpose of producing the corresponding keto acids proceeds preferably by introduction of the reaction material into cooled 5–20% sulfuric acid, at a temperature of −15° C. to +20° C. After separation of the organic phase from the aqueous-acid phase, the organic solvent is evaporated from the reaction material and is obtained in pure form. In the case in which the keto acid is also obtained in the form of its lactone or in reduced form as the corresponding hydroxy acid lactone, the free keto acid is extracted from the organic phase with aqueous 5–15% aqueous alkali metal hydroxide in the form of its alkali metal salt, so that after the evaporation of the solvent from the organic phase only lactone remains.

Pure free keto acid is obtained particularly upon the use of aluminum alkyl dihalides or aluminum alkyl sesquihalides in mol ratios with the mentioned acid anhydrides of 2:1 to 1.5:1, or by the use of aluminum alkyl dihalides or aluminum alkyl sesquihalides, aluminum trihalides and dicarboxylic acid anhydride in mol ratios of about 1:1:1 and the use of the lowest possible temperature, for example +20° C. and below. For the production of free $\alpha,\beta$-unsaturated $\gamma$-keto acids, the lowest possible temperatures are used, i.e. below about −10° C.

If the acids are not obtained in free form, but mainly in the form of their unsaturated lactones or the reduced, saturated lactones ($\gamma$-hydroxy acid lactones or $\delta$-hydroxy acid lactones) then higher temperatures, particularly temperatures at the boiling point of the solvent methylene chloride, are used. Furthermore, in these reactions, aluminum trialkyls can be used with success as the aluminum alkyl compounds. In this case there is used an excess of aluminum trialkyl or the aluminum trialkyl is added to a mixture of the acid anhydride with an aluminum trihalide, whereby the mol ratio of the three components is between about 1:1:1 and 3:6:1. The further working up of the reaction material to the lactone proceeds by introduction into dilute sulfuric acid and separation of the organic phase.

After distilling off of the solvent which is present and the present hydrocarbon, the lactone mixture is distilled by means of a good oil stream vacuum pump or steam stream vacuum pump. By saponification of the lactone mixture, the unsaturated portion is converted into keto acid, while the saturated portion of the lactone remains in the form of the corresponding hydroxy acid and is then obtained in pure form.

In the lactone mixture which corresponds to the saturated $\gamma$-keto acids and $\delta$-keto acids, the saturated portion predominates to a great extent, so that the reaction product can, by a simple catalytic subsquent hydrogenation be converted into pure hydroxy acid lactone. In the lactone mixture in which the $\alpha,\beta$-unsaturated $\gamma$-keto acids are present, the double unsaturated lactones (enol form of the keto acids) predominate.

Instead of simple aluminum trialkyl compounds, it is possible with success to also use addition products of aluminum triethyl or similar aluminum tri-n-alkyl compounds on ethylene or other olefins. Lactone mixtures are preferably obtained in this reaction.

It is possible by the method of the present invention to produce keto acids, particularly $\gamma$-keto acids and $\delta$-keto acids, or their corresponding saturated or unsaturated lactones, in yields of about 40–90% of the theoretical. The aluminum alkyl compounds can be completely used for the production of the free keto acids. The dicarboxylic acid anhydrides which serve as starting material are, in contrast to the other methods which use dicarboxylic acid dihalides or dicarboxylic acid semi-ester halides, easily producible and can be obtained in technical large quantities.

The invention is further illustrated by the following examples. The scope of the invention is not, however, meant to be limited to the specific details of these examples.

EXAMPLE 1

Production of $\gamma$-keto caproic acid 89 g. of aluminum ethyl sesquichloride (0.72 mol) are added dropwise at room temperature under vigorous stirring and under the exclusion of air and moisture to a solution of 35.6 g. of succinic acid anhydride (0.36 mol) in 250 cc. of methylene chloride. After the total addition, the mixture is heated to the boiling temperature of the solvent and is maintained under refluxing for two hours. The solution is then cooled and is slowly added under stirring into ice cold 20% sulfuric acid.

The organic phase is separated and the reaction material, after distillation of the solvent, is purified by fractional distillation. There is obtained 28 g. of $\gamma$-keto caproic acid (60% of the theoretical), B.P.$_{0.1}$=98–100° C., M.P.=34–36° C. Side products are 2.5 g. of the lactone mixture (6% of theoretical) of hexanolide-(4,1) and hexenolide-(4,1).

EXAMPLE 2

Production of $\delta$-keto enanthic acid

The production proceeds as described in Example 1. 36 g. of glutaric acid anhydride (0.32 mol) in 150 cc. of methylene chloride are reacted with 58 g. of aluminum ethyl sesquichloride (0.47 mol). After the recrystallization from gasoline, there remains 21 g. of $\delta$-keto enanthic acid (46% of the theoretical), which melts at 46–47° C. As side products there are obtained 6 g. of the lactones from the gasoline mother liquid (16% of the theoretical).

EXAMPLE 3

Production of $\beta$-propionylacrylic acid 83 g. of aluminum ethyl sesquichloride (0.67 mol) are slowly added under stirring and under the exclusion of air and moisture at −10° C. to a suspension of 32.7 g. of maleic acid anhydride (0.33 mol) in 250 cc. of methylene chloride. This mixture is further stirred for 5 hours at the same temperature. It is then introduced into 20% sulfuric acid at a temperature of −10° C. to −15° C. After the separation of the organic phase and the evaporation of the solvent, the acid is recrystallized from a large amount of gasoline. The pure yield is 20 g. of $\beta$-propionyl acrylic acid (47% of the theoretical) melting at 109–110° C. Moreover, there is obtained 7 g. (19% of the theoretical) of the keto acid corresponding to the unsaturated lactone.

EXAMPLE 4

Production of o-propionyl benzoic acid 70 g. of aluminum ethyl sesquichloride (0.57 mol) are added to a suspension of 41.4 g. of phthalic acid anhydride (0.28 mol) in 200 cc. of chlorobenzene analogously to Example 1. The solution is stirred for an additional 3 hours. After the hydrolysis by introduction into 15% sulfuric acid, the o-propionyl benzoic acid is shaken out of the organic phase with 10% aqueous sodium hydroxide. After acidification there is obtained 36.5 g. of the acid (74% of the theoretical) melting at 90–92° C.

EXAMPLE 5

Production of γ-ketocapric acid 50 g. of aluminum n-hexyl-dichloride (0.27 mol) are slowly added dropwise to a solution of 16 g. of succinic acid anhydride (0.16 mol) in 150 cc. of methylene chloride, analogously to Example 1. This mixture is further stirred for an additional 5 hours. After the hydrolysis by dropping of the reaction mixture into ice cold 20% sulfuric acid, the organic phase is separated and shaken with 10% aqueous sodium hydroxide. After the acidification of the liquid there separates 18 g. of crude γ-ketocapric acid melting at 62–64° C. (60% of the theoretical).

EXAMPLE 6

Production of γ-ketolauric acid 31.5 g. of aluminum n-octyl-dichloride (0.15 mol) are added to a solution of 15 g. of succinic acid anhydride (0.15 mol) and 20 g. of aluminum chloride (0.15 mol) in 250 cc. of methylene chloride, analogously to Example 1. Further working up proceeds as described in Example 5. After the recrystallization, the yield of pure γ-ketolauric acid is 17 g. The melting point is 77° C. The yield is 52% of the theoretical.

EXAMPLE 7

Production of β-nonanoylacrylic acid 65 g. of aluminum n-octyl-dichloride (0.31 mol) are slowly added at −20° C. to a suspension of 15 g. of maleic acid anhydride (0.15 mol) in 150 cc. of methylene chloride. The reaction mixture is stirred for 4 hours at −20° C. and then hydrolyzed by pouring into 20% sulfuric acid which is cooled to at least below −15° C. The organic phase is further worked up as described in Examples 5 and 6.

The yield is 20 g. of β-nonanoylacrylic acid (63% of the theoretical) melting at 92° C. The side product is 5 g. of unsaturated lactone (26% of the theoretical).

EXAMPLE 8

Production of the γ-ketocaproic acid corresponding lactone mixture 23.5 g. of finely pulverized succinic acid anhydride (0.23 mol) are added to 54 g. aluminum triethyl (0.47 mol) under the exclusion of air and moisture. After the mixture has been stirred for 5 hours at 50° C., it is subjected to hydrolysis by slowly being added dropwise into ice cold 15% sulfuric acid. The organic phase precipitates and is then separated and purified by distillation. The yield is 20 g. of a mixture of hexanolide-(4,1) and hexenolide-(4,1) in a mol ratio of 3:1; $B.P._{.12}$=100–105° C. The yield is 76% of the theoretical. By pressure hydrogenation with Raney nickel, the entire reaction product is converted into hexanolide-(4,1) (γ-caprolactone).

EXAMPLE 9

Production of a mixture γ-ketocapric acid with its corresponding lactones 58.5 g. of aluminum tri-n-hexyl (0.21 mol) are added as described in Example 1 to a solution of 60 g. of succinic acid anhydride (0.60 mol) and 40 g. of aluminum chloride (0.30 mol) in 200 cc. of methylene chloride. The solution is boiled under refluxing for 3 hours and then hydrolyzed by being poured into ice cold 20% sulfuric acid. The organic phase is separated and shaken with dilute aqueous sodium hydroxide. The solvent is then distilled-off and the reaction mixture is fractionally distilled by means of an oil pump vacuum. There is thus obtained 40 g. of a lactone mixture of decanolide-(4,1) and decenolide-(4,1) in a mol ratio of 3:1 (40% of the theoretical). 20 g. of γ-ketocapric acid (18% of the theoretical), melting at 60° C. are obtained from the sodium hydroxide liquor by acidification and extraction with ether.

EXAMPLE 10

Production of a γ-lactone mixture of various chain lengths from an ethylene addition product on aluminum triethyl 65.6 g. of aluminum chloride (0.49 mol) and 27.3 g. of succinic acid anhydride (0.27 mol) are added as described in Example 8 to 40 g. of an 80% hydrocarbon solution of an addition product of aluminum triethyl on ethylene with an average alkyl group length of $C_8$ (that is about 0.11 mol). After hydrolysis, the organic phase is washed with 5% aqueous sodium hydroxide and then by distillation in an oil pump vacuum freed of hydrocarbon and fractionated. There is thus obtained a total of 24 g. of a γ-lactone mixture of various chain lengths (about 57% of the theoretical). In addition, from the aqueous sodium hydroxide there is obtained by acidification 6 g. of a γ-keto acid mixture of various chain lengths (approximately 13% of the theoretical).

EXAMPLE 11

Production of β-propionylacrylic acid corresponding lactone mixture 95 g. of aluminum ethyl sesquichloride (0.77 mol) are added at room temperature under stirring and under exclusion of air and moisture to a suspension of 39 g. of maleic acid anhydride (0.40 mol) in 280 cc. of methylene chloride. The reaction mixture is heated to boiling under refluxing for more than 2 hours and then added to 20% ice cold sulfuric acid. After the separation of the organic phase, the solvent is distilled off and the reaction product is distilled in an oil pump vacuum. The yield is 32 g. of a mixture of unsaturated $C_6$-γ-lactone (84% of the theoretical).

EXAMPLE 12

Production of the 6-methyl-4-oxo-heptene-(2)-acid (1) corresponding lactone mixture 64 g. of aluminum isobutyl dichloride (0.41 mol) are slowly added dropwise under stirring and under air and moisture exclusion at +5° C. to a suspension of 26.5 g. of maleic acid anhydride (0.26 mol) in 200 cc. of methylene chloride. After the solution is stirred for 5 hours at this temperature, the same is poured into ice cold 20% sulfuric acid for hydrolysis. The organic phase is separated and shaken with 10% aqueous sodium hydroxide to remove the acid portion. The solvent is then distilled off under normal pressure and the reaction material is distilled by means of an oil pump vacuum. The yield is 15 g. of a mixture of unsaturated $C_8$-γ-lactone (41% of the theoretical).

While the invention has been specifically illustrated with respect to the production of certain keto acids using certain reactants, it is apparent that modifications and variations can be made without departing from the spirit or scope of the invention. Such variations and modifications are accordingly meant to be comprehended within the spirit and scope of the appended claims.

What we claim is:

1. A method of preparing a keto acid which comprises reacting at a temperaure of from −30° to +20° C. an organic dicarboxylic acid anhydride selected from the group consisting of succinic acid anhydride, maleic acid anhydride, phthalic acid anhydride and glutaric acid anhydride under exclusion of air and moisture with an aluminum alkyl compound of the formula $R_nAlCl_{3-n}$ wherein R is alkyl having from 2 to 8 carbon atoms and $n$ has a value of from 1 to 3 or with a mixture of said aluminum alkyl compound and aluminum trichloride wherein the molar ratio of said aluminum alkyl compound to said acid anhydride in the presence of aluminum trichloride amounts to from 1:1 to 2:1 and in the absence of aluminum trichloride being greater than 1:1 but not exceeding 2:1 and subjecting the thusly obtained product to hydrolysis at a temperature of between about −15 and +20° C. in the presence of 5–20% $H_2SO_4$.

2. Method according to claim 1 wherein the aluminum compound is a combination of aluminum trichloride and an n-alkyl aluminum compound in a mol ratio of about 1:1.

3. Method according to claim 1 wherein the acid anhydride is reacted with the alkyl aluminum compound in the presence of a solvent selected from the group consisting of methylene chloride and chlorobenzene.

4. Method according to claim 1 wherein the aluminum compound is ethyl aluminum sesquichloride.

5. Method according to claim 1 wherein the mol ratio of said aluminum alkyl compound or said mixture thereof with an aluminum trihalide to said dicarboxylic acid anhydride is between 1.5 and 2.0.

6. Method according to claim 1 wherein the aluminum alkyl compound is added to a solution of the dicarboxylic acid anhydride in a chlorinated hydrocarbon solvent therefor.

7. Method according to claim 1 wherein the dicarboxylic acid anhydride is in finely subdivided form.

8. Method according to claim 1 wherein the aluminum alkyl compound is selected from the group consisting of aluminum alkyl dihalide and aluminum alkyl sesquihalide and wherein the reaction temperature is no greater than about +20° C., whereby substantially free keto acid is produced.

9. Method according to claim 8 wherein said dicarboxylic anhydride is maleic acid anhydride and the temperature is maintained below −10° C. whereby there is formed the correspondingly unsaturated gamma-keto acid.

10. Method according to claim 1 wherein after hydrolysis the organic phase is separated from the aqueous phase for isolation of the reaction product.

11. Method according to claim 10 wherein the organic phase is distilled for recovery of the reaction product.

12. Method according to claim 1 wherein the aluminum alkyl is the addition product of a triethyl-aluminum compound on ethylene.

References Cited

UNITED STATES PATENTS

| Re. 25,797 | 6/1965 | Mirviss et al. | 260—413 XR |
| 2,588,802 | 3/1952 | Burtner et al. | 260—413 XR |
| 2,826,598 | 3/1958 | Ziegler et al. | 260—515 XR |
| 2,894,025 | 7/1959 | Anderson et al. | 260—515 XR |
| 3,412,116 | 11/1968 | Reinheckel et al. | 260—413 |

LEON ZITVER, Primary Examiner

HOWARD T. MARS, Assistant Examiner

U.S. Cl. X.R.

260—343.6, 413, 526